Patented June 6, 1933

1,913,044

UNITED STATES PATENT OFFICE

ARNO R. SASSE, OF KANSAS CITY, MISSOURI, ASSIGNOR OF ONE-HALF TO CLARENCE M. HARDENBERGH, OF MINNEAPOLIS, MINNESOTA

BREAD DOUGH IMPROVING AND BLEACHING PROCESS AND COMPOSITION

No Drawing.     Application filed December 9, 1929.  Serial No. 412,939.

My invention relates to bread making processes, and more particularly to processes of preparing flour and dough for making bread, and prepared flour and dough employed in exemplifying the process, the principal objects of the invention being to improve the texture and color of bread, and to increase the volume of bread loaves.

Bleaching agents and other ingredients heretofore mixed with flour for improving the color and quality of bread ordinarily become effective by acting directly on yeast or flour or releasing elements that act on yeast or flour, for example releasing oxygen to oxidize the flour. A relatively large proportion of such agents must be incorporated in the prepared flour to provide sufficient elements to act on flour or yeast, with resulting disadvantages of excessive liability to decomposition before the flour is mixed with water, and excessive proportions of foreign matter in the dough and bread.

Further objects of my invention therefore are to reduce the amount of treating agent necessary for effecting desired improvement in dough and bread, to facilitate the action of the treating agent, to assure equal treating of all particles of the dough, to assure protection of the treating agents in the flour until water is mixed with the flour to form dough, and to promote the action of treating agents when brought into contact with water added to the flour to make dough.

In accomplishing these and other objects of the invention, I have provided a new process of making a prepared flour dough, and a new article of commerce comprising a prepared flour by the use of which the improved dough and improved bread may be produced, which will be particularly described.

In its general aspect, the invention consists in incorporating treating agents and carbonates in flour, and associating protective substances with said agents to insure a colloidal condition of the agents when acted on by the carbonates in the presence of the water added to the flour to form dough.

The treating agents preferably consist of manganese and iron compounds, in organic or inorganic combinations, and in crystalline or colloidal forms. A treating agent may consist of a single manganese or iron compound, or may include both manganese and iron compounds.

The protective substances may comprise one or more compounds of the class including citrates and tartrates, such as sodium citrate, sodium tartrate, etc.; a vegetable gum such as gum arabic, or albumen, for example egg albumen.

The carbonate element may comprise bicarbonates or carbonates of sodium or potassium.

Dry starch may further be employed as a filler and to prevent the treating agents, carbonates and protective substances from reacting in a moist atmosphere.

I have found that certain substances, notably manganese and iron compounds to which I have given special attention, when protected and carried by flour in company with carbonates, will react with the carbonates in the presence of water to form colloidal hydroxy compounds of manganese and iron which act catalytically to promote oxidation of the coloring matter in the dough, and have other beneficial effects. Since the agents serve as catalysts, relatively small components may be employed compared with the amounts of agents necessary when released elements combine with ingredients of the dough to effect improvement thereof.

A specific preferred formula for a dough-improving composition adapted to become effective in the presence of water added to flour to form dough, consists of the following ingredients in substantially the proportions named by weight.

| | |
|---|---:|
| Manganese succinate (substantially $MnC_4H_4O_4$) | 1.0 |
| Ferrous lactate $Fe(C_3H_5O_3)_2 \cdot 3H_2O$ | 0.3 |
| Gum arabic | 1.0 |
| Sodium citrate | 3.0 |
| Sodium bicarbonate | 1.0 |
| Starch | 93.7 |
| | 100.0 |

Two to 8 ounces of the above preparation may be used for each 100 pounds of flour for making dough and may be mixed with the flour to form a prepared product.

When either the manganese or the iron compound is used alone, the proportion of starch is increased to make up for the omitted element.

While not committing myself to any theory, but in an attempt to explain the reactions whereby a relatively small amount of treating agent may be effective on a relatively large body of flour, the successive steps of a process will be described in which manganese succinate is employed as the chief treating agent.

The useful reacting agents added to flour for treating dough would consist of 1 part manganese succinate, to 1 part of sodium bicarbonate, which is to be brought into reacting relation with the succinate when water is added to flour for making dough. For each part of succinate in a body of flour, 3 parts of sodium citrate and one part of gum arabic is provided. For convenience, to assure accurate measurement, and to prevent effects of atmospheric moisture, the succinate, citrate and gum arabic are mixed with a relatively large body of dehydrated corn starch, and the carbonate may also be mixed with said ingredients before the same are added to the flour.

The reacting agents may be added to the flour at any time previous to the addition of water thereto to form dough. The carbonate element may be added separately to the water, and when naturally present in the water used for dough, may be omitted from the mixture added to flour. The amount of carbonate added to the flour in company with other reacting agents may be varied proportionately to the proportion of carbonate in the water, to bring about association of carbonate with the other reacting agents in substantially the proportions named.

When water is added to flour prepared as above described, a colloidal manganous hydroxide is evidently formed.

It is understood that the dough is in contact with air during the mixing process, and that oxygen, including atmospheric oxygen, is entangled in the dough. The hydroxide is oxidized to the dioxide, by an atom of an oxygen molecule, the other atom of the oxygen molecule reacting with the coloring matter, namely the organic compound carotin in the flour, to oxidize the same.

The manganese dioxide is capable of giving up its extra atom of oxygen and does so to oxidize another portion of the organic compound, whereupon the manganous hydroxide is restored and the cycle is repeated.

The citrate has served in the above described process to inhibit formation of flocculent precipitates of the metal compound, and promotes the formation of a colloidal form of the hydroxy compound of the metal with the carbonate. The gum arabic has assisted in retaining the manganese hydroxide in colloidal distribution throughout the dough mass.

Either the citrate or the tartrate radical may serve to protect the treating agent in the manner described, and either may be employed with either manganese or iron compounds to protect the same and promote the desired combination thereof with a carbonate to provide an hydroxy compound to serve as a catalyst in my process.

What I claim and desire to secure by Letters Patent is:

1. A composition for the purpose describe including a water soluble iron salt, a water soluble citrate, and a water soluble carbonate.

2. A prepared flour including a water soluble manganese salt, a water soluble citrate, and a water soluble carbonate.

3. A composition of the character described adapted to be added to flour for action in the presence of water to treat the flour, including a water soluble iron salt, a water soluble carbonate, and a colloidal protective agent.

4. A composition for the purpose described adapted to act catalytically in the presence of water, including a water soluble iron salt, a water soluble inhibiting agent, and a water soluble carbonate.

5. A composition of the character described adapted for action in the presence of water to treat flour, including a water soluble manganese salt, a water soluble carbonate, a water soluble citrate, and a gum adapted to be effective in the presence of water.

6. In a prepared flour, an ingredient added to the flour to make dough, including ferrous lactate, manganese succinate, sodium citrate, and sodium carbonate.

7. A prepared flour including an ingredient adapted to be effective in the presence of atmospheric oxygen and water containing a carbonate in solution added to the flour to make dough, said ingredient including a water soluble manganese salt and a water soluble citrate.

8. A prepared flour comprising the following ingredients in substantially the proportions named: 100 pounds wheat flour, and 2 ounces of a mixture comprising 94 parts dry starch, 1 part manganese succinate, 1 part gum arabic, 3 parts sodium citrate, 1 part sodium bicarbonate.

9. The process of treating flour comprising adding a water soluble iron salt and a water soluble carbonate to the flour to serve as a catalyst in the presence of water for treating the flour.

10. The process of treating flour comprising adding a water soluble iron salt to the flour to serve as a catalyst in the presence of water for treating the flour, adding a water soluble carbonate to the flour to react with the salt in the presence of water to form a hydroxy compound, adding a protective agent to the flour, and adding water to the flour to form dough and bring about formation of a colloidal hydroxide to react catalytically with organic compounds of the flour for oxidizing the same.

11. The process of treating flour comprising adding a water soluble manganese salt to the flour to serve as a catalyst in the presence of water for treating the flour, adding a water soluble carbonate to the flour to react with the salt in the presence of water to form a hydroxy compound, adding a water-soluble inhibiting agent to the flour, and adding water to the mixture of carbonate, manganese salt and flour to form dough and bring about formation of a colloidal hydroxide to react catalytically with atmospheric oxygen and organic compounds of the flour for oxidizing said compounds.

12. The process of treating flour comprising adding a water soluble iron salt to the flour to serve as a catalyst in the presence of water for treating the flour, adding a water soluble carbonate to the flour to react with the salt in the presence of water, adding a water soluble citrate to the flour to inhibit flocculent precipitation of iron compounds and promote formation of a hydroxy compound, and adding water to the flour to form dough and bring about formation of a colloidal hydroxide to react catalytically with organic compounds of the flour for oxidizing the same.

13. The process of treating flour comprising adding to the flour a water soluble manganese salt to serve as a catalyst in the presence of water for treating the flour, adding a water soluble citrate to the flour to inhibit flocculent precipitation of the metal in the presence of water and a carbonate, adding a water soluble carbonate to the flour to react with the salt in the presence of water and citrate to form a hydroxy compound, and adding water to the flour to form dough and bring about formation of a colloidal hydroxide to react catalytically with organic compounds of the flour and free oxygen in the dough for oxidizing the organic compounds.

14. The process of treating dough comprising adding ferrous lactate to flour to serve as a catalyst in the presence of water for treating the flour, adding a water soluble citrate to the flour to inhibit flocculent precipitation of the metal in the presence of water and a carbonate, adding a water soluble carbonate to the flour to react with the ferrous lactate in the presence of water and citrate to form a hydroxy compound, adding a gum to the flour as a protective agent for the hydroxy compound, and adding water to the flour to form dough and bring about formation of a colloidal hydroxide to react catalytically with organic compounds of the flour for oxidizing the same.

15. A bread improver including ferrous lactate and a water soluble carbonate.

16. A bread improver including a water soluble iron salt, a water soluble bicarbonate, and an inhibitor of flocculent precipitation of compounds of the salt and the bicarbonate.

17. A bread improver including 3 parts of a water soluble iron salt, a water-soluble carbonate, and 30 parts of a water soluble tartrate.

18. A bread improver including the following ingredients in substantially the proportions named: ferrous lactate, 3 parts; a water soluble carbonate, 10 parts; and a water soluble tartrate, 30 parts.

19. A bread improver including manganese succinate and a water-soluble bicarbonate.

20. A bread improver including a water soluble manganese salt, a water soluble carbonate, and a water soluble tartrate.

21. A bread improver including a water soluble iron salt tending to react with a water soluble carbonate in the presence of water to form a precipitate, and a water soluble tartrate for inhibiting precipitation of compounds formed by the salt and carbonate.

22. The process of treating dough mixed with a solution of carbonate in water, including introducing into the dough a water soluble manganese salt normally reacting with the carbonate of the solution to form a precipitate, and inhibiting the formation of a precipitate.

23. A process of the character described including introducing into a mixture of flour containing organic compounds and water containing a carbonate in solution, a water soluble iron salt normally tending to combine with the carbonate to form iron carbonate, inhibiting precipitation of iron carbonate to enable iron compounds to oxidize said organic compounds, and introducing oxygen into the dough to replace oxygen given up by said iron compounds.

24. A process of the character described including mixing a body of flour containing organic compounds with water containing a carbonate in solution to form a dough and introduce free oxygen into the dough, introducing into the dough a water soluble manganese salt tending to react with the carbonate to form a precipitate, and adding an inhibiting agent to prevent precipitation and promote catalytic action of manganese compounds with the oxygen and the organic compounds.

25. In a process of the character described including mixing wheat flour containing organic compounds and carbonate-containing-water in the presence of atmospheric air to form dough, the steps of introducing into the dough a water soluble iron salt normally combining with carbonate in the presence of the water to form precipitating compounds of the metal, introducing a protective agent to prevent flocculent precipitation of produced hydroxy compounds, employing the mixing process to bring the hydroxy compound into contact with oxygen of the air entangled in the dough to oxidize the hydroxy compound to the dioxide of said metal, bringing about contact between the dioxide and said organic compounds to oxidize quantities of said organic compounds and reduce the dioxide to the hydroxy compound, and continuing the mixing process to repeatedly reoxidize the hydroxy compound and oxidize further quantities of said organic compounds.

26. A prepared flour containing an ingredient adapted to react with carbonate in carbonate-containing water added to the flour to make dough, said ingredient including ferrous lactate.

27. The process of treating flour comprising adding manganese succinate to the flour to serve as a catalyst in the presence of water for treating the flour, adding a water-soluble carbonate to the flour to react with the salt in the presence of water to form a hydroxy compound, adding a water-soluble citrate to the flour to inhibit flocculent precipitation of manganese compounds, adding water to the flour to form dough and bring about formation of a colloidal hydroxide to react catalytically with organic compounds of the flour for oxidizing the same and inhibiting flocculent precipitation of the salt in the presence of the water.

In testimony whereof I affix my signature.

ARNO R. SASSE.